United States Patent [19]

Valasin

[11] Patent Number: 5,415,430
[45] Date of Patent: May 16, 1995

[54] SEAT BELT ANCHOR ASSEMBLY

[75] Inventor: Anthony J. Valasin, Grosse Ile, Mich.

[73] Assignee: Ford Motor Company, Dearborn, Mich.

[21] Appl. No.: 192,320

[22] Filed: Feb. 4, 1994

Related U.S. Application Data

[63] Continuation of Ser. No. 992,373, Dec. 17, 1992, abandoned.

[51] Int. Cl.⁶ .................... B60R 22/18; B60R 22/22
[52] U.S. Cl. .................. 280/801.1; 297/468
[58] Field of Search ............ 280/801.1, 808; 297/468, 483; 403/116, 117

[56] References Cited

U.S. PATENT DOCUMENTS

| 4,222,610 | 9/1980 | Takada | 297/483 |
|---|---|---|---|
| 4,253,702 | 3/1981 | Lehr | 280/801.1 |
| 4,331,349 | 5/1982 | Funahashi | 280/801.1 |
| 4,334,701 | 6/1982 | Takada | 280/804 |
| 4,451,087 | 5/1984 | Tamamushi | 280/801.1 |
| 4,452,469 | 6/1984 | Rogers, Jr. | 280/801.1 |
| 4,643,449 | 2/1987 | Sasaki et al. | 280/808 |
| 4,682,790 | 7/1987 | Katsuno et al. | 280/801.1 |
| 4,702,491 | 10/1987 | Meyer | 280/808 |
| 4,789,186 | 12/1988 | Andersson | 280/808 |
| 4,989,901 | 2/1991 | Adomeit | 280/808 |
| 5,016,916 | 5/1991 | Yokote et al. | 280/808 |
| 5,022,677 | 6/1991 | Barbiero | 280/801.1 |
| 5,037,135 | 8/1991 | Kotikovsky et al. | 280/808 |

FOREIGN PATENT DOCUMENTS

| 0216738 | 4/1987 | European Pat. Off. . | |
| 0280270 | 8/1988 | European Pat. Off. . | |
| 1157498 | 11/1963 | Germany | 280/801.1 |
| 2726683 | 1/1979 | Germany | 297/482 |
| 2100970 | 1/1983 | United Kingdom . | |
| 2123269 | 2/1984 | United Kingdom . | |
| 2176091 | 12/1986 | United Kingdom . | |

*Primary Examiner*—Margaret A. Focarino
*Assistant Examiner*—Peter C. English
*Attorney, Agent, or Firm*—Daniel M. Stock; Roger L. May

[57] ABSTRACT

A belt anchor assembly includes an anchor plate disposed adjacent vehicle structure and having a belt attached thereto. The belt anchor assembly also includes a fastener securing the anchor plate to the vehicle structure. The anchor plate includes a structure cooperating with the vehicle structure to limit rotation of the anchor plate about the fastener to a predetermined amount and to orientate the anchor plate relative to the vehicle structure.

15 Claims, 2 Drawing Sheets

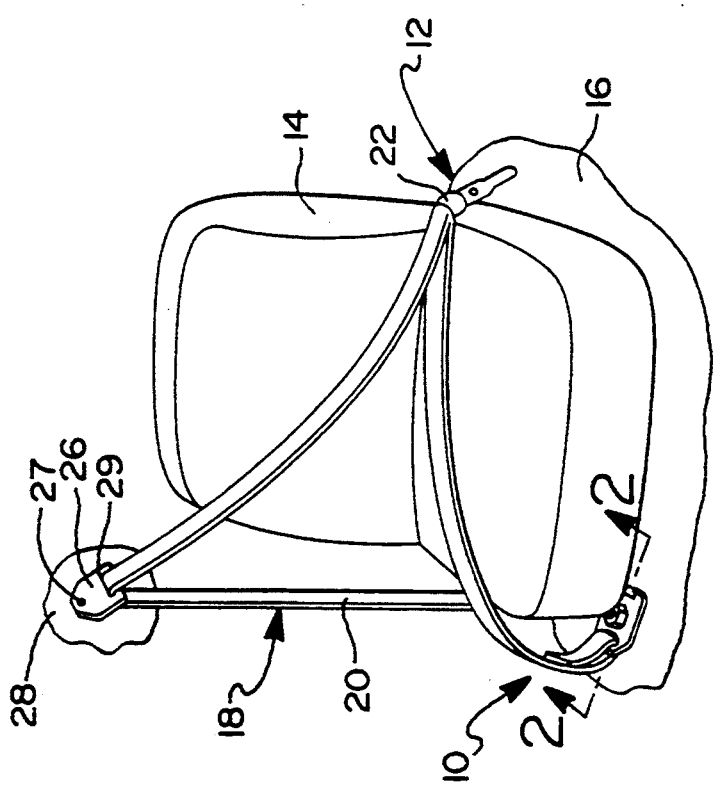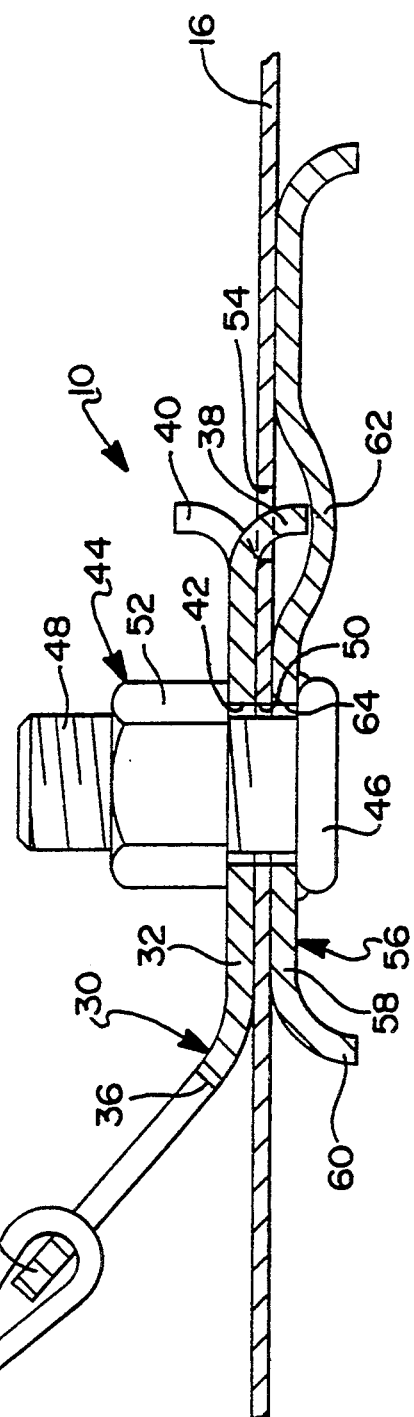

SEAT BELT ANCHOR ASSEMBLY

This is a continuation of U.S. patent application Ser. No. 07/992,373, filed Dec. 17, 1992, now abandoned.

BACKGROUND OF THE INVENTION

1. Field of the Invention

The present invention relates generally to seat belt systems for vehicles and, more specifically to, a belt anchor assembly for a seat belt system on a vehicle.

2. Description of the Related Art

It is known to construct seat belt systems for vehicles to restrain forward movement of a vehicle occupant in the event of a sudden vehicle deceleration. It is also known to construct a belt anchor assembly for the seat belt system to anchor a length of belt webbing to vehicle structure. Typically, the belt anchor assembly includes an anchor plate having the belt webbing attached thereto. The anchor plate is secured to the vehicle structure by a fastener. While this approach securely anchors one end of the seat belt system to the vehicle structure, it suffers from the disadvantage that the anchor plate may rotate about the fastener which is undesired. Another disadvantage of the belt anchor assembly is that the anchor plate may not be orientated in a desired position when secured to the vehicle structure during installation.

SUMMARY OF THE INVENTION

Accordingly, the present invention is a belt anchor assembly including an anchor plate disposed adjacent vehicle structure and having a belt attached thereto. The belt anchor assembly also includes a fastener securing the anchor plate to the vehicle structure. The anchor plate includes means for cooperating with the vehicle structure to limit rotation of the anchor plate about the fastener to a predetermined amount and to orientate the anchor plate relative to the vehicle structure.

One advantage of the present invention is that a belt anchor assembly is provided for a seat belt system on a vehicle. Another advantage of the present invention is that the anchor plate has a tab which cooperates with a slot in the vehicle structure to limit rotation of the belt anchor assembly. Yet another advantage of the present invention is that the tab and slot cooperate to provide a predetermined orientation of the anchor plate relative to vehicle structure that precludes installation judgment. A further advantage of the present invention is that a reinforcement member has a relief which encloses the tab and slot and permits no opening to the outside of the interior compartment of the vehicle, thereby precluding entry of moisture, etc.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 1 is a perspective view of a belt anchor assembly, according to the present invention, illustrated in operational relationship on a vehicle.

FIG. 2 is a sectional view taken along line 2—2 of FIG. 1.

DESCRIPTION OF THE PREFERRED EMBODIMENT(S)

Figure 3:
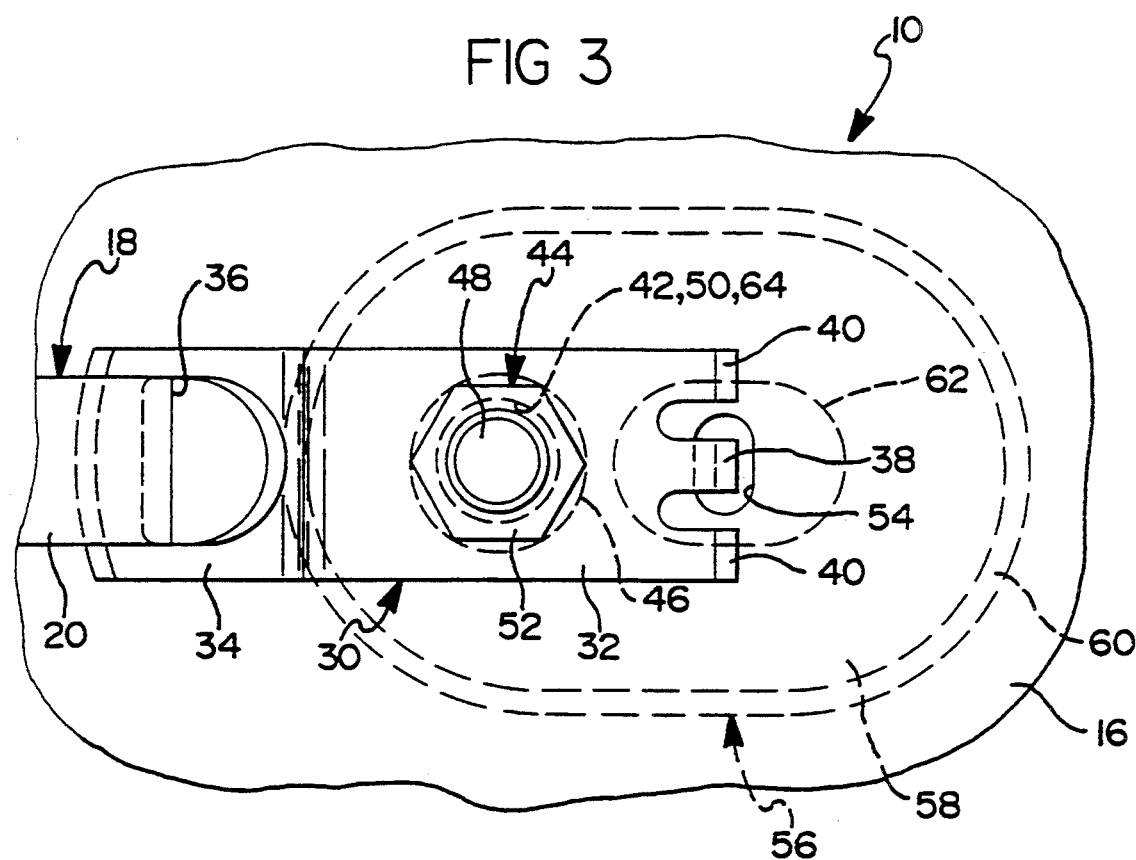
FIG. 3 is a plan view of the belt anchor assembly of FIG. 1.

Referring to the drawings and in particular FIG. 1 thereof, a belt anchor assembly 10, according to the present invention, is illustrated in operational relationship on a vehicle 12 (partially shown) such as an automotive vehicle. The vehicle 12 includes a seat 14 for supporting an occupant (not shown) in an interior or occupant compartment of the vehicle 12. The vehicle 12 also includes vehicle structure such as a vehicle underbody 16 to support the seat 14. The vehicle 12 further includes a seat belt system, generally indicated at 18, for restraining an occupant in the seat 14.

The seat belt system 18 includes a belt 20 of webbing material or the like having one end attached to the belt anchor assembly 10. The seat belt system 10 also includes a buckle assembly 22 which is secured to the vehicle underbody 16 by suitable means such as a fastener (not shown). It should be appreciated that the belt 20 extends through a portion of the buckle assembly 22 in a known manner.

The seat belt system 10 may include a guide member 26 secured by suitable means such as a fastener 27 to an upper portion of vehicle structure 28 such as a "B" pillar. The guide member 26 has an aperture 29 through which the belt 20 extends. The seat belt system 10 may further include a retractor assembly (not shown) secured to the vehicle underbody 16 to retract and extend the belt 20. It should be appreciated that the belt 20 is attached to the retractor assembly in a known manner. It should also be appreciated that the seat belt system 10 is a continuous loop three (3) point active seat belt system which is known in the art.

Referring to FIGS. 2 and 3, the belt anchor assembly 10 includes an anchor plate, generally indicated at 30, disposed adjacent the vehicle underbody 16. The anchor plate 30 has a base portion 32 extending axially and an inclined portion 34 extending at an angle from the base portion 32. The inclined portion 34 has an aperture 36 extending therethrough. The belt 20 extends through the aperture 36 and is attached to itself by suitable means such as stitching in the form of a loop. The base portion 32 has a first tab 38 extending downwardly or perpendicularly in one direction and a pair of spaced second tabs 40 extending upwardly or in the opposite direction for a function to be described. The first tab 38 is disposed between and spaced from the second tabs 40. The base portion 32 further includes a second aperture 42 spaced axially between the inclined portion 34 and tabs 38, 40 and extending therethrough.

The belt anchor assembly 10 also includes a fastener, generally indicated at 44, to removeably secure the anchor plate 30 to the vehicle underbody 16. The fastener 44 is a stud having a head 46 disposed on a side of the vehicle underbody 16 opposite the anchor plate 30 and a threaded shaft 48 extending through an aperture 50 in the vehicle underbody 16 and the aperture 42 in anchor plate 30. The fastener 44 also includes a nut 52 threadably engaging the shaft 48 and disposed adjacent the anchor plate 30. It should be appreciated that the fastener 44 may be a weld stud, weld nut or extruded hole. It should also be appreciated that the belt anchor assembly 10 may be attached to other vehicle structure such as a side sill member, quarter panel, etc.

The belt anchor assembly 10 includes an aperture or slot 54 in the vehicle underbody 16 and located in a predetermined position relative to the aperture 50. The first tab 38 of the anchor plate 30 extends into the slot 54. The first tab 38 cooperates with the slot 54 to orientate the anchor plate 30 relative to the vehicle underbody 16. The slot 54 extends laterally a predetermined distance and cooperates with the first tab 38 to limit rotation of the anchor plate 30 about the fastener 44 to a predetermined amount such as ten degrees (10°) on either side of a plane extending between centerlines of the aperture 50 and slot 54.

The belt anchor assembly 10 further includes a reinforcement member, generally indicated at 56, disposed adjacent the vehicle underbody 16 on a side opposite the anchor plate 30. The reinforcement member 56 has a body 58 extending axially and which is generally oval shaped. The reinforcement member 56 also has a flange 60 extending downwardly or perpendicularly to the body 58. The reinforcement member 56 further has a recess or relief 62 in the body 58 which extends axially and is generally oval shaped. The relief 62 is located adjacent the slot 54 and extends outwardly perpendicularly from the body 58 to clear the first tab 38. The reinforcement member 56 also has an aperture 64 extending through the body 58. The shaft 48 of the fastener 44 extends through the aperture 64. The reinforcement member 56 may be welded to the vehicle underbody 16 by suitable means such as spot welding. Optionally, the head 46 of the fastener 44 may be welded to the reinforcement member 56.

In operation, the belt 20 is extended through the aperture 36 of the anchor plate 30 and secured to itself. The anchor plate 30 is disposed adjacent the vehicle underbody 16 such that the first tab 38 extends through the slot 54 and the aperture 42 is aligned with the aperture 50. The shaft 48 of the fastener 44 is extended through the aperture 64 in the reinforcement member 56 and apertures 42, 50. The relief 62 is orientated over the slot 54 to clear the first tab 38 in the anchor plate 30. The nut 52 is threaded on the shaft 48 and secured to sandwich the reinforcement member 56 and anchor plate 30 to the vehicle underbody 16 between the head 46 and nut 52. The reinforcement member 56 is secured to the vehicle underbody 16 by welding and the head 46 of the fastener 44 is secured to the reinforcement member 56 by welding. It should be appreciated that the belt anchor assembly 10 may be used to orientate and limit rotation of the buckle assembly 22 or the retractor assembly for the seat belt system 18 relative to vehicle structure.

Figure 4:
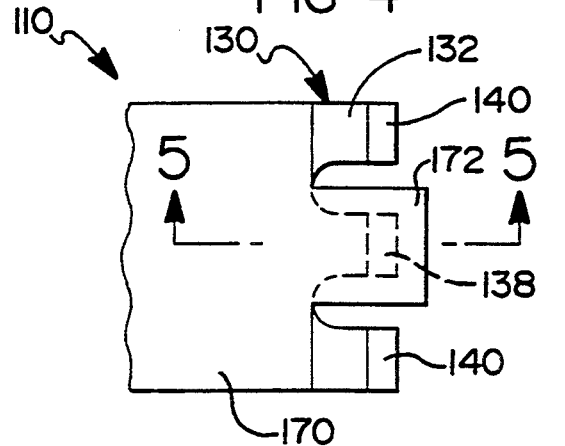
FIG. 4 is a partial fragmentary view of an alternate embodiment of the belt anchor assembly of FIG. 1.
Figure 5:
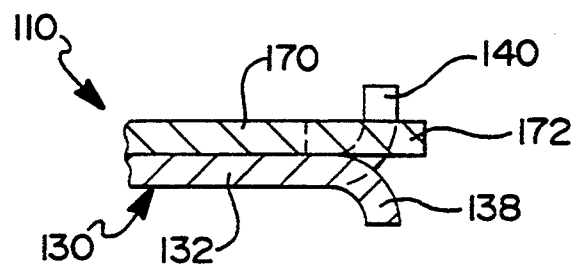
FIG. 5 is a sectional view taken along line 5—5 of FIG. 4.

Referring to FIGS. 4 and 5, an alternate embodiment 110 of the belt anchor assembly 10 is shown. Like parts of the belt anchor assembly 10 have like reference numerals increased by 100. The belt anchor assembly 110 may include a second anchor plate 170 disposed adjacent the anchor plate 130 and having an aperture (not shown) through which the fastener (not shown) extends. The second anchor plate 170 is also attached to a belt (not shown) of the seat belt system 18. The second anchor plate 170 has a third tab 172 extending axially and disposed between the second tabs 140. The third tab 172 cooperates with the second tabs 140 on the anchor plate 130 to limit rotation of second anchor plate 170 about the fastener 44. It should be appreciated that the operation of the belt anchor assembly 110 is similar to the belt anchor assembly 10.

Accordingly, the belt anchor assembly 10 limits rotation of the anchor plate 30 about the fastener 44 by engagement between the first tab 38 and the sides of the slot 54. The first tab 38 and slot 54 also provide a predetermined orientation to the anchor plate 30 relative to the fastener 44 and vehicle underbody 16. The reinforcement member 56 has a relief 62 which clears the tab 38 and encloses the slot 54 preventing no access to outside of the interior compartment and precludes entry of moisture, etc. The belt anchor assembly 110 may include a second anchor plate 170 having a third tab 172 which cooperates with the second tabs 140 of the anchor plate 130 to limit rotation of the second anchor plate 170 about the fastener.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A belt anchor assembly, comprising:
   an anchor plate disposed adjacent a vehicle structure and having a base portion extending generally parallel to the vehicle structure and an inclined portion extending at an angle from said base portion, said inclined portion having a belt attached thereto;
   a fastener securing said base portion of said anchor plate to the vehicle structure;
   said base portion of said anchor plate including a first tab extending downwardly and cooperating with a slot in the vehicle structure for cooperating with the vehicle structure to limit rotation of said anchor plate about said fastener to a predetermined amount relative to the vehicle structure; and
   a reinforcement member disposed adjacent the vehicle structure on a side opposite said anchor plate and including means forming a recess to enclose said first tab said fastener securing said reinforcement member to the vehicle structure.

2. A belt anchor assembly as set forth in claim 1 including a reinforcement member disposed adjacent the vehicle structure on a side opposite said anchor plate, said fastener securing said reinforcement member to the vehicle structure.

3. A belt anchor assembly as set forth in claim 1 wherein said inclined portion includes means forming a first aperture extending therethrough, the belt extending through said first aperture.

4. A belt anchor assembly as set forth in claim 3 wherein said base portion includes means forming a second aperture extending therethrough.

5. A belt anchor assembly as set forth in claim 1 wherein said fastener has a head disposed on a side of the vehicle structure opposite said anchor plate, a shaft extending through an aperture in the vehicle structure and said anchor plate, and a nut threadably engaging said shaft and disposed adjacent said anchor plate.

6. A belt anchor assembly, comprising:
   an anchor plate disposed adjacent a vehicle structure and having a belt attached thereto;
   a fastener securing said anchor plate to the vehicle structure;

said anchor plate including means for cooperating with the vehicle structure to limit rotation of said anchor plate about said fastener to a predetermined amount relative to the vehicle structure;

said cooperating means comprising a first tab extending from said anchor plate and engaging a slot in the vehicle structure;

a reinforcement member disposed adjacent the vehicle structure on a side opposite said anchor plate, said fastener securing said reinforcement member to the vehicle structure; and wherein said reinforcement member includes means forming a recess to enclose said first tab.

7. A belt anchor assembly, comprising:
an anchor plate disposed adjacent a vehicle structure and having a belt attached thereto;
a fastener securing said anchor plate to the vehicle structure;
said anchor plate including means for cooperating with the vehicle structure to limit rotation of said anchor plate about said fastener to a predetermined amount relative to the vehicle structure;.
said cooperating means comprising a first tab extending from said anchor plate and engaging a slot in the vehicle structure;
a reinforcement member disposed adjacent the vehicle structure on a side opposite said anchor plate, said fastener securing said reinforcement member to the vehicle structure;
said reinforcement member including means forming a recess to enclose said first tab; and
means for fixedly securing said reinforcement member to the vehicle structure.

8. A belt anchor assembly as set forth in claim 7 wherein said fixedly securing means comprises welds.

9. A belt anchor assembly, comprising:
an anchor plate disposed adjacent a vehicle structure and having a base portion extending generally parallel to the vehicle structure and an inclined portion extending at an angle from said base portion, said inclined portion having a belt attached thereto;
a fastener securing said base portion of said anchor plate to the vehicle structure;
said base portion of said anchor plate including a first tab extending downwardly and cooperating with a slot in the vehicle structure to orientate said anchor plate about said fastener relative to the vehicle structure and a pair of spaced second tabs extending upwardly, said first tab being disposed between said second tabs; and
a reinforcement member disposed adjacent the vehicle structure on a side opposite said anchor plate and including means forming a recess to enclose said first tab said fastener securing said reinforcement member to the vehicle structure.

10. A belt anchor assembly as set forth in claim 9 including a reinforcement member disposed adjacent the vehicle structure on a side opposite said anchor plate, said fastener securing said reinforcement member to the vehicle structure.

11. A belt anchor assembly as set forth in claim 9 wherein said base portion includes a first aperture extending therethrough.

12. A belt anchor assembly as set forth in claim 11 wherein said fastener has a head disposed on a side of the vehicle structure opposite said anchor plate, a shaft extending through an aperture in the vehicle structure and said first aperture and a nut threadably engaging said shaft and disposed adjacent said anchor plate.

13. A belt anchor assembly, comprising:
an anchor plate disposed adjacent a vehicle structure and having a belt attached thereto;
a fastener securing said anchor plate to the vehicle structure;
said anchor plate including a first tab cooperating with a slot in the vehicle structure to orientate said anchor plate about said fastener relative to the vehicle structure;
a reinforcement member disposed adjacent the vehicle structure on a side opposite said anchor plate, said fastener securing said reinforcement member to the vehicle structure; and
wherein said reinforcement member includes means forming a recess to enclose said first tab.

14. A belt anchor assembly, comprising:
an anchor plate disposed adjacent a vehicle structure and having a belt attached thereto;
a fastener securing said anchor plate to the vehicle structure;
said anchor plate including a first tab extending downwardly and cooperating with a slot in the vehicle structure to orientate said anchor plate about said fastener relative to the vehicle structure and a pair of spaced second tabs extending upwardly, said first tab being disposed between said second tabs;
said anchor plate including a first aperture extending therethrough;
said fastener having a head disposed on a side of the vehicle structure opposite said anchor plate, a shaft extending through an aperture in the vehicle structure and said first aperture and a nut threadably engaging said shaft and disposed adjacent said anchor plate; and
a second anchor plate disposed adjacent said anchor plate and having a third tab disposed between said second tabs.

15. An anchor assembly, comprising:
an anchor plate disposed adjacent a vehicle structure, said anchor plate having a base portion extending generally parallel to the vehicle structure and a first tab extending downwardly from said base portion and engaging a slot in the vehicle structure;
a reinforcement member disposed adjacent the vehicle structure on a side opposite said anchor plate and having means defining a recess that encloses said first tab; and
a fastening means for securing said anchor plate and said reinforcement member to the vehicle structure.

* * * * *